Patented Jan. 14, 1941

2,228,783

UNITED STATES PATENT OFFICE 2,228,783

METHOD OF TREATING MATERIALS AND ARTICLE RESULTING THEREFROM

Franklin S. Smith, New Haven, Conn.

No Drawing. Application August 13, 1938,
Serial No. 224,748

3 Claims. (Cl. 99—171)

This invention relates to the art of producing insect-free articles, such as packages of cereals; and, more in particular, to a process for packaging and treating products, and the articles produced by said process.

One of the objects of this invention is to provide a method and mechanism for packaging materials, such as cereals and the like, wherein the materials may be packaged, sealed and labeled, and the packages then treated by use of electricity. Another object is to provide a container for products such as cereals and means to fill, seal and label the container, the characteristics of the container and sealing means being such that the dielectric properties of the package are substantially uniform throughout.

Another object is to provide a package of the above character which may be thoroughly and reliably treated by means of electrical discharges immediately after sealing and/or labeling. Another object is to provide a package of material which may be thoroughly and reliably freed of all insect life, including adult, larvae, pupae and egg stages, and which will remain free of said insect life. These and other objects will be in part obvious and in part pointed out below.

The invention accordingly consists in the features of construction, combinations of elements, arrangements of parts and in the several steps and relation and order of each of the same to one or more of the others, all as will be illustratively described herein, and the scope of the application of which will be indicated in the following claims.

This application is a continuation-in-part of my copending application, Serial No. 722,685, filed April 27, 1934, entitled "Adhesive," and to issue August 23, 1938, as Patent No. 2,127,540; and the matter disclosed but not claimed in that application is claimed herein. Reference should be had to my Patent No. 1,959,390, issued May 22, 1934, entitled "Art and apparatus for sterilizing."

In the past, there has been much loss in certain industries, such as the food industry, due to contamination by insects, and difficulty has been encountered when attempts have been made to avoid this contamination. Insect life in one or more of its various stages may be present within the product and, though not evident, may later develop and spread so as to impair the quality of an entire bin of the product. Treating the product in bulk, and later packaging it has not been entirely satisfactory as the containers or labels may be infested or infestation may enter the product from the machinery during the packaging operation.

According to the present invention, the product is packaged, and then sealed or labeled, and the finished package is thus treated. In this manner, an insect-free article is produced, and even if the package is not sealed infestation may be avoided by carefully protecting the package.

In the illustrative form of treatment, the packages are subjected to a high-voltage electric treatment whereby corona-like discharges occur throughout the entire package. Any insect life in any form which is present in the package is sought out by the discharges and destroyed.

This procedure of filling the containers, sealing or labeling them, and subjecting them to the electrical treatment may be carried on efficiently with dependable results. However, in order to insure a uniform distribution of the discharges, it is important that the package have uniform dielectric properties throughout. For example, if one portion of the package is of high dielectric strength and an adjacent portion is of low dielectric strength, the discharges may occur only in the portion having low dielectric strength. This may injure the product, and insect life might be so positioned, within the portion having high dielectric strength, as to avoid treatment. Accordingly, the container used in the process has dielectric properties substantially the same as the corresponding properties of the product being packaged. Illustratively, the container is made of material such as boxboard, pasteboard, paper, or the like.

Under some conditions of usage, the treating step may follow the sealing or labeling step so closely that the adhesive material upon a package is still somewhat plastic at the time the package is subjected to the discharge. Under these circumstances, a thermo-plastic adhesive is used having dielectric properties, whether liquid or solid, which are substantially the same as the dielectric properties of the product and the container. Accordingly, the container is filled with the product, it is sealed or labeled, and it is immediately passed through the treating apparatus. The resulting article is free of infestation, and it will not become contaminated.

A type of adhesive which is admirably adapted for uses of this character is that disclosed in my copending application. Such an adhesive has sufficient initial tack to hold the flaps of the package down until the adhesive sets, and it is strong enough to securely hold the flaps or the label in place. At the same time, by properly selecting and proportioning the ingredients in accordance with the teachings of my copending application, the adhesive will set at the proper time after its application even though it is used under varying conditions and with various types of packaging machines.

Thus, it will be seen that there has been provided in this invention a method of packaging and treating materials, and an article embodying the combination of a container filled with a product, all of which is in accordance with the various objects hereinbefore noted, together with many thoroughly practical advantages which are successfully achieved.

As many possible embodiments may be made of the mechanical features of the above invention and as the art herein described might be varied in various parts, all without departing from the scope of the invention, it is to be understood that all the matter hereinabove set forth is to be interpreted as illustrative and not in a limiting sense.

I claim:

1. As a new article of manufacture, a sealed package comprising a container filled with a product and sealed with a thermoplastic adhesive, said adhesive having an appreciable initial tack and an appreciable heat of fusion, said package having substantially uniform dielectric properties throughout irrespective of the condition of solidification of said adhesive—whereby said package may be subjected to high electrical stress immediately after the sealing of the container without danger of uneven distribution of the electrical stress.

2. In the art of producing insect-free packages of a product having appreciable dielectric strength, the process of performing the following steps in the order named: placing a quantity of the product into a container having substantially the same dielectric properties as the corresponding properties of the product, performing the step of closing and sealing said container with a thermoplastic adhesive material having dielectric properties which do not vary when the adhesive material changes between its fluid and solid conditions, the dielectric properties of said adhesive material being substantially the same as the corresponding properties of the container; and subjecting the sealed package to an electrical treatment by creating a high electrical gradient within a treatment zone occupied by the package to thereby produce corona-like discharges which seek out and destroy any insect life within the package irrespective of the fluid condition of the adhesive material.

3. In the art of producing insect-free packages of a product having appreciable dielectric strength, the process of performing the following steps in the order named: placing a quantity of the product into a container having substantially the same dielectric properties as the corresponding properties of the product, performing the step of closing and sealing said container with a thermoplastic adhesive material having dielectric properties which do not vary when the adhesive material changes between its fluid and solid conditions, the dielectric properties of said adhesive material being substantially the same as the corresponding properties of the container, and said adhesive material having an appreciable initial tack so that it is immediately effective upon application; and subjecting the sealed package to an electrical treatment by creating a high electrical gradient within a treatment zone occupied by the package to thereby produce corona-like discharges which seek out and destroy any insect life within the package irrespective of the fluid condition of the adhesive material.

FRANKLIN S. SMITH.